United States Patent
Spieth

(10) Patent No.: US 9,249,713 B2
(45) Date of Patent: Feb. 2, 2016

(54) VEHICLE COMPONENT

(75) Inventor: Arnulf Spieth, Hochdorf (DE)

(73) Assignee: Eberspaecher Exhaust Technology GmbH & Co. KG, Neunkirchen (DE)

(*) Notice: Subject to any disclaimer, the term of this patent is extended or adjusted under 35 U.S.C. 154(b) by 497 days.

(21) Appl. No.: 13/308,018

(22) Filed: Nov. 30, 2011

(65) Prior Publication Data

US 2012/0137665 A1    Jun. 7, 2012

(30) Foreign Application Priority Data

Dec. 2, 2010   (DE) .................. 10 2010 062 335

(51) Int. Cl.
*F01N 3/10*   (2006.01)
*F01N 13/18*  (2010.01)
*F01N 3/28*   (2006.01)

(52) U.S. Cl.
CPC ............. *F01N 13/1822* (2013.01); *F01N 3/28* (2013.01); *B23K 2201/006* (2013.01); *F01N 2260/18* (2013.01); *F01N 2450/22* (2013.01)

(58) Field of Classification Search
CPC ..... F01N 13/1822; F01N 3/28; F01N 3/2803; F01N 3/2839
USPC ........... 60/272, 274–324; 248/300, 617, 674, 248/339, 301, 304, 205.1, 693, 216.1, 248/217.3, 218.1, 50–90, 610; 29/426.1, 29/890.08
See application file for complete search history.

(56) References Cited

U.S. PATENT DOCUMENTS

| | | | | |
|---|---|---|---|---|
| 3,001,752 | A * | 9/1961 | Loy | 248/216.1 |
| 5,845,037 | A * | 12/1998 | Miekis | 385/136 |
| 6,058,702 | A * | 5/2000 | Jorg Alexnat et al. | 60/322 |
| 6,481,673 | B1 * | 11/2002 | Roe et al. | 248/62 |
| 6,660,235 | B1 | 12/2003 | Holpp et al. | |
| 7,013,613 | B1 * | 3/2006 | Boellner et al. | 52/837 |
| 7,753,335 | B2 * | 7/2010 | Ogimura | 248/610 |
| 2007/0119155 | A1 * | 5/2007 | Tongu et al. | 60/299 |
| 2008/0000718 | A1 * | 1/2008 | Yasuda et al. | 181/227 |

FOREIGN PATENT DOCUMENTS

| | | |
|---|---|---|
| DE | 36 43 698 C1 | 7/1988 |
| DE | 603 08 954 T2 | 6/2007 |
| EP | 0 795 683 A1 | 9/1997 |
| JP | 2003293762 A | 10/2003 |
| JP | 2007 112302 A | 5/2007 |

* cited by examiner

*Primary Examiner* — Jesse Bogue
*Assistant Examiner* — Kelsey Stanek
(74) *Attorney, Agent, or Firm* — Reinhart Boerner Van Deuren P.C.

(57) ABSTRACT

The present invention relates to a component (1) for a motor vehicle (5), particularly an exhaust system, which can be fastened to a carrier (4) of the motor vehicle (5) by means of at least one fixture (3), with a component housing (2) comprising a housing wall (6), wherein the respective fixture (3) comprises at least one holder (8) having an inner leg (9) extending parallel to the housing wall (6) and an outer leg (10) standing away from the housing wall (6) to the outside.

The fatigue strength of the fixture (3) can be improved if the housing wall (6) comprises a passage opening (7), through which the outer leg (10) protrudes, while the inner leg (9) areally bears against the housing wall (6) in the interior (11) of the component housing (2).

10 Claims, 3 Drawing Sheets

VEHICLE COMPONENT

CROSS-REFERENCE TO RELATED PATENT APPLICATIONS

This patent application claims priority to German Application No. 102010062335.0, filed Dec. 2, 2010, the entire teachings and disclosure of which are incorporated herein by reference thereto.

FIELD OF THE INVENTION

The present invention relates to a component for a motor vehicle, particularly an exhaust system, which can be fastened to a carrier of the motor vehicle by means of at least one fixture.

BACKGROUND OF THE INVENTION

On motor vehicles, particularly on commercial vehicles, different components such as for example a fuel tank or a component of an exhaust system which for example can be a silencer and/or an exhaust gas treatment device which in particular can operate with a catalytic converter and/or with a particle filter and/or with an SCR-system can be fastened to a carrier, such as for example a support frame, a transmission, an engine block.

Usually, such a component comprises a component housing having a housing wall. In order to now be able to fasten the component to the carrier, at least one fixture is provided, which on the component side comprises at least one holder. The respective holder comprises an inner leg extending parallel to the housing wall and an outer leg standing away from the housing wall to the outside. In particular, the respective holder can be configured L-shaped or T-shaped in profile.

In principle, it is possible to weld the inner leg to the housing wall outside, for example through spot welds and/or welding seams. However, it has been shown however that the respective fixture in vehicle operation is exposed to very high mechanical loads. On the one hand, the respective component fastened to the carrier via the respective fixture can have a comparatively high weight. On the other hand, comparatively severe shocks or vibrations can occur while driving, particularly in off-road mode. These high mechanical loads of the respective fixture can result in that cracks can form in the welded connection between inner leg and housing wall or even in the housing wall itself, which can lead to a weakening of the respective fixture and ultimately to a failure of the respective fixture.

The present invention deals with the problem of stating an improved embodiment for a component of the type mentioned at the outset or for the associated fixture which is particularly characterized in that it has a comparatively high fatigue durability.

SUMMARY OF THE INVENTION

According to the invention, this object is solved through the subject of the independent claim. Advantageous embodiments are the subject of the dependent claims.

The invention is based on the general idea of bringing the inner leg in the interior of the component housing to areally bear against the housing wall. To this end, the housing wall is equipped with a passage opening, through which the outer leg stands away to the outside. Through the areal contact of the inner leg with the inner side of the housing wall, an areal support for the force transmission between inner leg and housing wall is achieved, which reduces the load of a welded connection between inner leg and housing wall if applicable accordingly. Because of this, the risk of a crack formation in the region of the welded connection can be significantly reduced. The invention in this case utilises the realisation not to achieve the force transmission within the respective fixture exclusively via the respective welded connection, but to a substantial part via an areal support of the inner leg on the inside of the housing wall. In particular, the respective holder can be configured L-shaped or T-shaped in profile.

According to an advantageous embodiment, the respective fixture can have a covering which in the interior of the component housing bridges the passage opening and the respective inner leg and is fastened to the housing wall. With the help of this covering, stresses in the region of the passage opening that can develop through the supporting of the inner leg on the housing wall can be reduced, as a result of which the risk of a crack formation in the housing wall on an edge enclosing the passage opening is reduced.

It is particularly advantageous to configure the covering such and/or fasten the covering to the housing wall such that it tightly closes off the passage opening from the inside. Particularly for the event that the respective component is a component of an exhaust system or a fuel tank it is desirable to seal off the interior towards the surroundings. This can be realised in the region of the passage opening with the help of the respective covering.

With another embodiment it can be provided to fasten the respective inner leg only to the covering so that it is fastened to the housing wall only indirectly, namely by way of the covering. A fastening of the inner legs to the housing wall is then dispensable. Thus, the inner leg with this embodiment supports itself directly on the housing wall only via a positive connection.

With an alternative embodiment, the respective inner leg and the covering can be jointly fastened to the housing wall, for example by means of at least one common weld seam, which can then be embodied by so-called three-sheet-seam since it interconnects three sheet metal bodies simultaneously. However, in principle, yet a further alternative is conceivable, wherein the inner leg and the covering each by themselves, are fastened to the housing wall, particularly by means of separate welded connections.

According to another embodiment, the covering can areally bear against the respective inner leg. Because of this, an areal support of the inner leg on the covering is additionally realised, which improves the force transmission and reduces the loading of the weld seams involved.

According to an advantageous embodiment, the housing wall adjoining the passage opening can have a protrusion protruding to the outside for the respective inner leg. In said protrusion, the respective inner leg then comes to areally bear against the housing wall. Because of this, a sunk arrangement for the inner leg in the interior of the component housing is obtained, as a result of which in particularly an interfering contour in the interior of the housing can be avoided. Furthermore, the shaping for the covering if provided is simplified as a result. It can be particularly practically provided here to select a depth of the protrusion so that it substantially corresponds to a thickness of the respective inner leg. Because of this, the inner leg can be sunk in the protrusion flush with the inside of the housing wall.

With another embodiment, the respective fixture can comprise a reinforcing element in addition to the respective holder, which comprises a support leg which runs parallel to the outer leg of the respective holder and bears against said outer leg and a clamping leg which runs parallel to the inner leg of the respective holder and areally bears against the housing wall outside. Preferentially, the respective reinforcing element is configured L-shaped in profile. Furthermore, a positioned fixing of the respective reinforcing element relative to the respective holder is provided. For example, reinforcing element and holder can be fastened to each other, for example by means of a welded connection or a screw connection. By way of the reinforcing element, an areal force transmission between clamping leg and housing wall now also takes place, which leads to a further unloading of any welded connections that may be present.

Particularly advantageous is an embodiment, wherein the respective fixture comprises two such holders, whose inner leg stands away in opposite direction to the outer legs areally bearing against each other. Furthermore, the outer legs can be practically fastened to each other, for example welded to each other. Through the two holders, the welded connections can be unloaded in two opposite force application directions, since in both force application directions one of the inner legs is areally supported on the inside of the housing wall and because of this makes possible a force transmission unloading the welded connections.

Particularly practical is a further development, wherein the respective fixture additionally comprises two such reinforcing elements, whose clamping legs stand away from the support legs in opposite direction. Thus, a doubling of the force transmission and thus the unloading of the welded connections is realised also in the region of the reinforcing elements. Particularly practically it can be provided here, that the two reinforcing elements form a reinforcing shoe which as unitary component or as unit can be fitted onto the two outer legs of the holders. In principle, an alternative embodiment is also conceivable there, wherein although two reinforcing elements are provided, only a single holder is provided. In particular, the two reinforcing elements can then again form a reinforcing shoe as an option, which can then however be fitted only on the one outer leg of the one holder.

The component that can be fastened to the vehicle with the help of the fixture introduced here can preferentially be an exhaust gas treatment device comprising at least one element from the group of silencer, catalytic converter, particle filter, SCR-system, urea injection device. Insofar, the present invention also relates to an exhaust gas treatment device, which can be fastened to a motor vehicle by means of at least one such fixture.

Furthermore, the present invention relates to the introduced fixture taken by itself.

Further important features and advantages of the invention are obtained from the subclaims, from the drawings and from the corresponding Figure description by means of the drawings.

It is to be understood, that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar or functionally same components.

It shows, in each case schematically

DETAILED DESCRIPTION OF THE INVENTION

Figure 1:
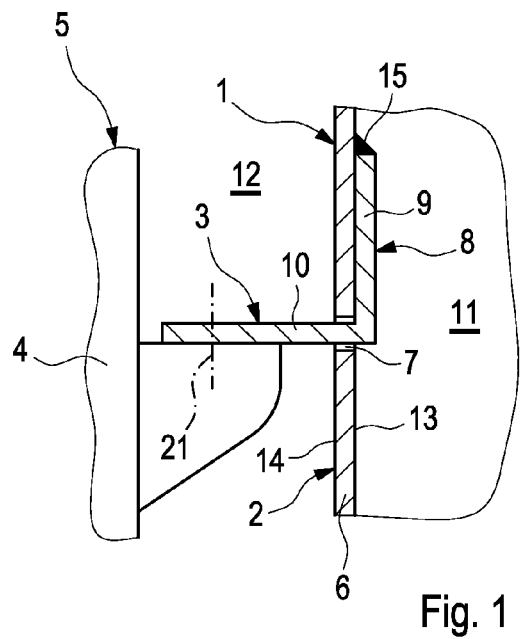
FIG. 1-12 a highly simplified sectional view of a component each in the region of a fixture, with different embodiments.

Corresponding to the FIGS. 1-12, a component 1 which is only represented partially here comprises a component housing 2 and at least one fixture 3, with the help of which the component 1 can be fastened to a carrier 4 of a motor vehicle 5 which is not otherwise shown. The component 1 preferably relates to an exhaust gas treatment device which comprises a silencer or a catalytic converter or a particle filter or an SCR-system with an injection device for ammonia or urea or urea-water solution and with an SCR-catalytic converter, or all the above mentioned components or any combination of the above mentioned components. The carrier 4 for example is a support frame of the vehicle or a transmission or an engine block or any other component of the vehicle suitable for carrying the component 1.

The component housing 2 comprises a housing wall 6, which in the region of the fixture 3 has a passage opening 7. The respective fixture 3 comprises at least one holder 8, which comprises at least two legs angled-off against each other by approximately 90°, namely an inner leg 9, which extends parallel to the housing wall 6, and an outer leg 10, which stands away from the housing wall 6 to the outside. In the shown examples, the holder 8 is each configured L-shaped in profile. Alternatively, a configuration that is T-shaped in profile is also possible. The housing wall 6 separates an interior 11 of the housing 2, i.e. a housing interior 11 from surroundings 12 of the housing 2. Accordingly, the housing wall 6 has an inner side 13 facing the interior 11 and an outer side 14 facing the surroundings.

With the fixture 3 introduced here, the respective holder 8 is mounted so that its inner leg 9 in the housing interior 11 areally bears against the housing wall 6, i.e. against its inner side 13, while the outer leg 10 protrudes through the passage opening 7. In the example of FIG. 1, the holder 8 is welded to the housing wall 6 in the region of its inner leg 9, i.e. in the housing interior 11. A corresponding weld seam is designated 15.

According to the FIGS. 2-7 and 9-12, the respective fixture 3 according to an advantageous embodiment can additionally comprise a covering 16, which is arranged in the interior 11. There, the covering 16 bridges the passage opening 7 from the inside and the respective inner leg 9. Furthermore, the covering is fastened to the housing wall 6, namely to its inner side 13. Preferably, the covering 16 is welded to the housing wall 6. Corresponding weld seams are again designated 15. The covering 16 is practically dimensioned so that it covers the passage opening 7 and the respective inner leg 9 on all sides. Furthermore, at least one closed circumferential weld seam 15 can be provided, which connects the covering 16 to the housing wall 6. In this manner, the passage opening 7 can be closed off in a gas-tight manner from the inside with the help of the covering 16.

Figure 2:
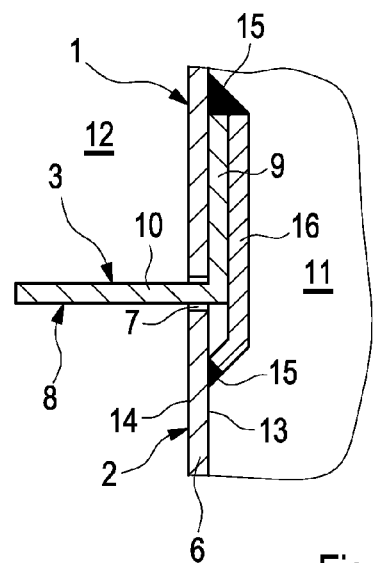

With the embodiment shown in FIG. 2, the inner leg 9 and the covering 16 are fastened to each other and to the housing wall 6 via a common weld seam 15. This weld seam 15 in this case forms a so-called three-sheet-seam.

Figure 3:
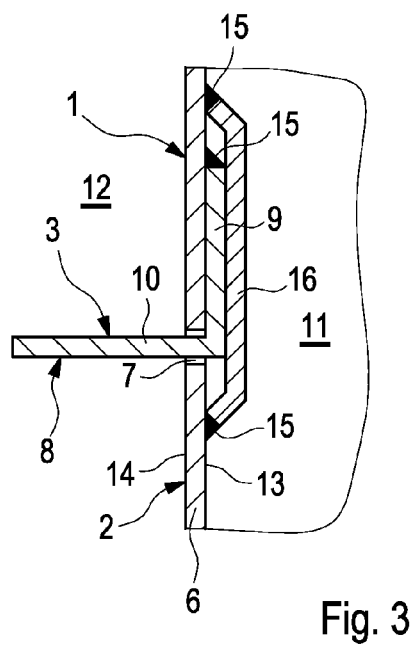
Figure 4:
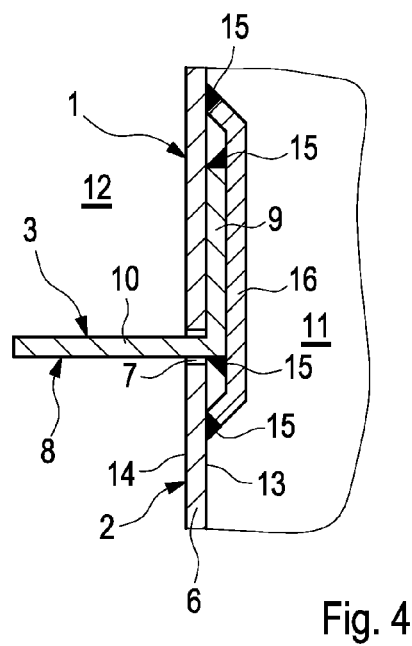
Figure 5:
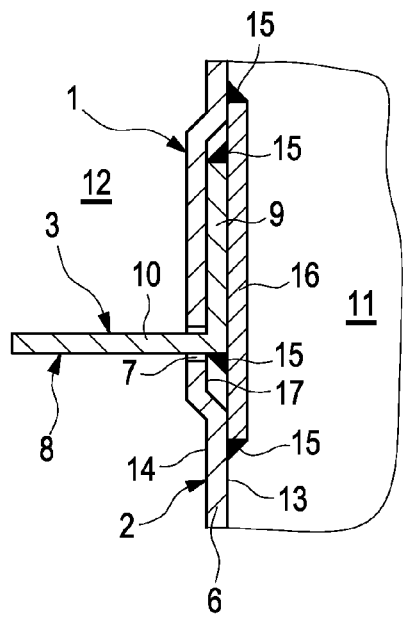
Figure 6:
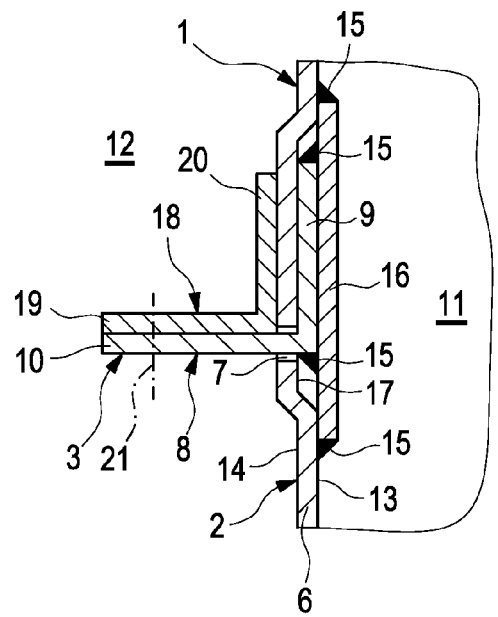
Figure 7:
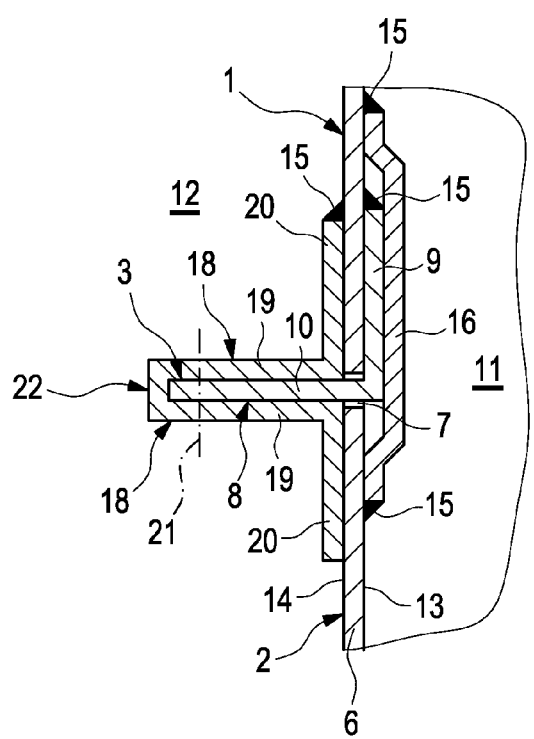
Figure 11:
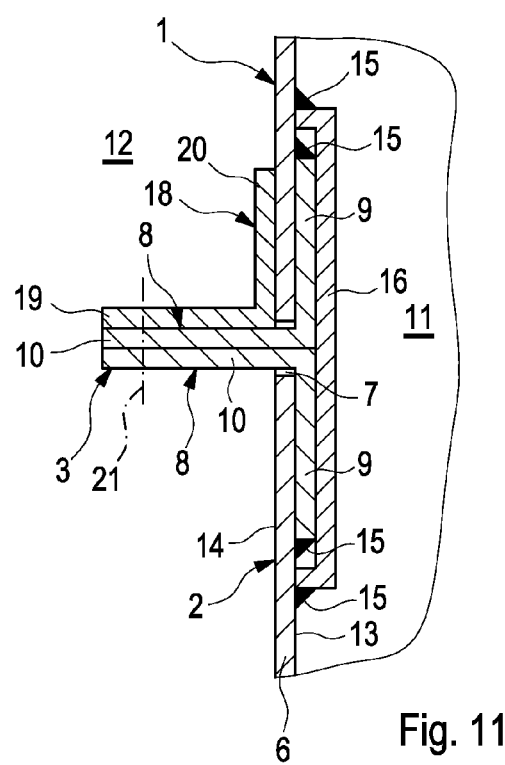

Alternatively, it is also possible according to FIG. 3, to fasten the inner leg 9 and the covering 16 separately to the housing wall 6, independently of each other. Corresponding weld seams are again designated 15. FIGS. 7 and 11 also show embodiments, wherein the respective inner leg 9 and the covering 16 are fastened to the housing wall 6 via separate welding points 15.

In contrast with this, FIGS. 4-6 and 9-12 show embodiments, wherein the respective inner leg 9 is fastened to the covering 16, for example via welded connections 15, while the covering 16 itself is fastened to the housing wall 6, for example via welding points 15.

Practically, the respective covering 16 so that it areally comes to bear against the respective inner leg 9. In the region of the fixture 3, housing wall 6, the respective inner let 9 and the covering 16 are configured planar at least in the regions in which they areally bear against each other.

With the embodiments of FIGS. 5, 6, 10 and 12, the housing wall 6 for the respective inner leg 9 comprises a protrusion 17 protruding to the outside, that is in the direction of the surroundings 12, which adjoins the passage opening 7. The protrusion 17 in this case is so dimensioned that within the protrusion 17 the respective inner leg 9 areally comes to bear against the housing wall 6. In particular, a depth of the protrusion 17 measured parallel to the outer leg 10 can substantially correspond to a thickness of the respective inner leg 9. Because of this it is possible to arrange the respective inner leg 9 sunk in the protrusion 17 flush with the housing wall 6.

According to the embodiments of the FIGS. 6, 7, 11 and 12, the respective fixture 3 as option comprises at least one reinforcing element 18 in addition to the respective holder 8, which likewise comprises two legs standing away from each other by 90°, namely a support leg 19 running parallel to the outer leg 10 of the respective holder 8 and a clamping leg 20 running parallel to the inner leg 9 of the respective holder 8. In the examples, the respective reinforcing element 18 is configured L-shaped in profile. The respective support leg 19 areally bears against the outer leg 10 of the assigned holder 8. The respective clamping leg 20 by contrast areally bears against the housing wall 6 on the outside in such a manner that the clamping leg 20 and the inner leg 9 of the associated holder 8 receive the housing wall 6 between them sandwich-like, particularly clamp said housing wall in between them. The reinforcing element 18 and the associated holder 8 are position-fixed relative to each other, wherein a corresponding position fixing is indicated by a dash hyphen dotted line and designated 21. For example, such a position fixing 21 can be realised by means of a screw connection or by means of a welded connection. In particular, the position fixing 21 between reinforcing element 18 and associated holder 8 takes place in the region of the legs bearing against each other, i.e. in the region of the outer leg 10 and of the support leg 19. For example, the outer leg 10 is screwed or welded to the support leg 19.

With the embodiment shown in FIG. 7, two such reinforcing elements 18 are provided, whose support legs 19 areally bear against the same outer leg 10 of the one holder 8 on sides facing away from each other. The two reinforcing elements 18 in this case can be separate components and particularly constructed identically. However, a special embodiment is shown in FIG. 7, wherein the two reinforcing elements 18 jointly form a reinforcing shoe 22, which as part of the assembly of the fixture 3, can be fitted onto the outer leg 10 on the outside. For example, the reinforcing shoe 22 can be formed by welding the two reinforcing elements 18 together. The reinforcing shoe 22 can likewise be an integral formed sheet metal part which integrally comprises the two reinforcing elements 18.

Purely exemplarily, FIG. 7 additionally shows the possibility of connecting at least one of the reinforcing elements 18, in this case the upper one, to the housing wall 6 in the region of the clamping leg 20, for example by means of a welded connection.

With the embodiments of FIGS. 1-7, the respective fixture 3 comprises only a single holder 8. In contrast with this, FIGS. 8-12 show embodiments, wherein the respective fixture 3 comprises two such holders 8 are arranged within the respective fixture 3 such that their inner legs 9 are orientated in opposite direction and in that their outer legs 10 areally bear against each other. Thus, the inner legs 9 stand away from the outer legs 10 in opposite direction. The outer legs 10 of the two holders 8 bearing against each other can be position-fixed relative to each other. A corresponding position fixing is indicated in the FIGS. 8-12 likewise by a dash hyphen dotted line and designated 21. Such a position fixing 21 can for example be realised through a welded connection or a screw connection. Instead of the in each case two holders 8 L-shaped in profile, a single holder that is T-shaped in profile can also be used in order to realise the embodiments of FIGS. 8 to 12.

Figure 8:
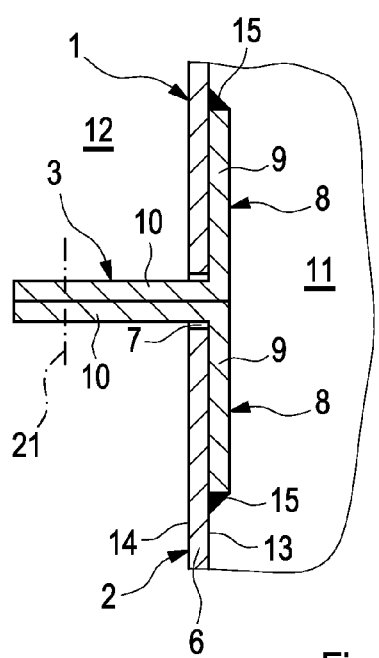

The simple embodiment of the fixture 3 shown in FIG. 8 differs from the embodiment shown in FIG. 1 merely by the second holder 8 and in particular manages without covering 16. A certain sealing of the passage opening 7 with this embodiment can be realised for example by a closed circumferential weld seam, which fixes the inner legs 9 of the two holders 8 on the housing wall 6.

Figure 9:
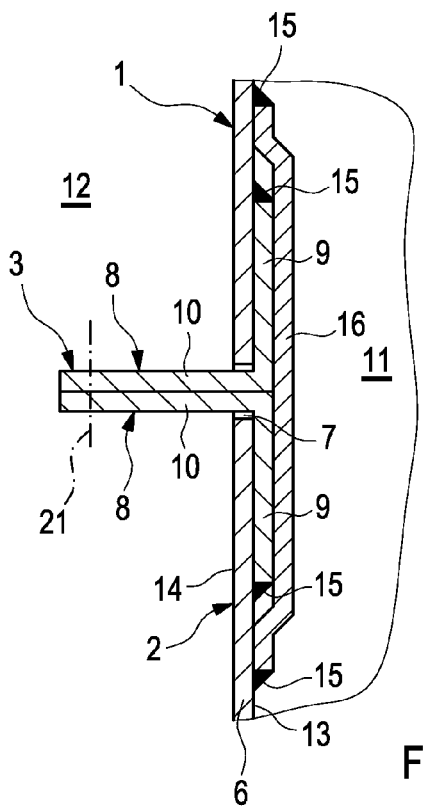

According to FIG. 9, the fixture 3 equipped with two holders 9 can also be provided with a covering 16, which accordingly bridges both inner legs 9. Here, an effective sealing of the passage opening 7 is practically effected via a corresponding geometry of the covering 16 and a corresponding fastening of the covering 16 to the housing wall 6, particularly by means of a circumferential weld seam 15. In the example of FIG. 9, the inner legs 9 of the two holders 8 are each fastened to the covering 16. Apart from the second holder 8, the embodiment shown in FIG. 9 thus largely corresponds to the embodiment show in FIG. 4.

Figure 10:
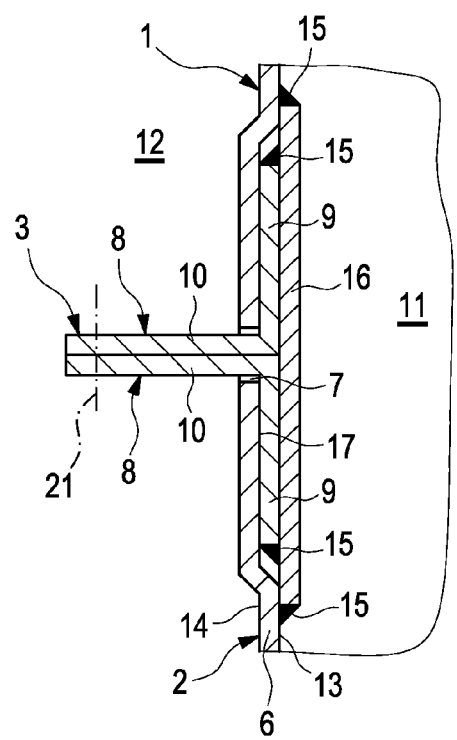

The embodiment shown in FIG. 10 largely corresponds to the embodiment shown in FIG. 9, but is additionally provided with a protrusion 17 in the region of the passage opening 7 for the respective inner leg 9. Insofar, the embodiment shown in FIG. 10 largely corresponds to the embodiment shown in FIG. 5 and differs from that merely through the second holder 8.

With the embodiment shown in FIG. 11, the fixture 3 is again equipped with a reinforcing element 18 in order to improve the support of the one fixture 8 on the housing wall 6. Insofar, the embodiment shown in FIG. 11 largely corresponds to the embodiment shown in FIG. 6, but has two holders 8. Here, too, a fixing 21 between the reinforcing element 18 and the associated holder 8 is provided. In this case, an integrated fixing 21 is provided, which on the one hand fixes the two outer legs 10 to each other and on the other hand fixes the support leg 19 to the outer leg of the associated holder 8. In addition, the upper holder 8 with the representation shown in FIG. 11 is exemplarily fixed to the housing wall 6, while the lower holder 8 is exemplarily fixed to the covering 16. The embodiment shown in FIG. 11 largely corresponds to the embodiment shown in FIG. 6, but in particular differs from that through the second holder 8 and through the missing protrusion 17.

Figure 12:
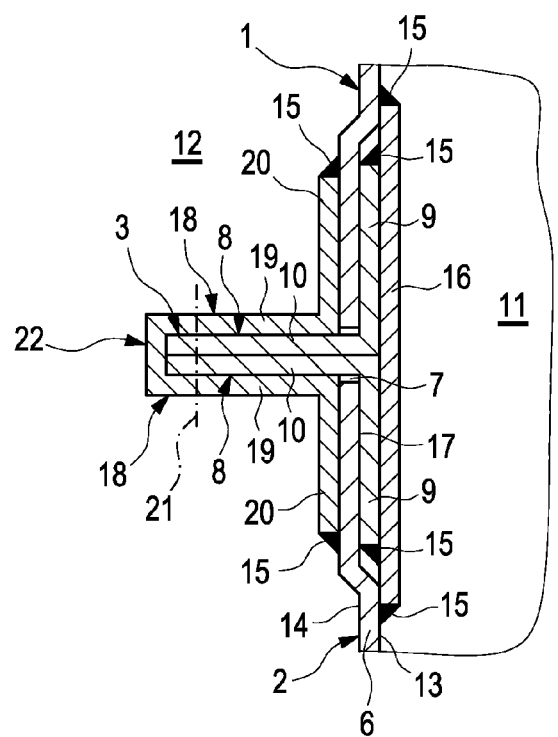

With the embodiment shown in FIG. 12, the protrusions 17 are provided according to the embodiment shown in FIG. 10. Furthermore, two reinforcing elements 18 are provided, namely for each holder 8 a reinforcing element 18 each. The two reinforcing elements 18 can be two separate components, but which in particular are identical in construction. In FIG. 12, however, a particular embodiment is shown, wherein the two reinforcing elements 18 form a reinforcing shoe 22, into which the two reinforcing elements 18 are combined. This can for example be realised by way of a welded connection between the two reinforcing elements 18 or by an integral shaping or unitary manufacture of the reinforcing shoe 22. The reinforcing shoe 22 can be practically dimensioned so that for the assembly of the fixture 3 it can be fitted from the outside onto the two outer legs 10 of the two holders 8. In the example of FIG. 12, the two reinforcing elements 18 are additionally welded to the housing wall 6 in the region of their clamping legs 20. Corresponding welding points are again designated 15.

The respective reinforcing element 18 in the embodiments of FIGS. 6, 7, 11 and 12 areally comes to bear against the outside 14 of the housing wall 6 with its clamping leg 20 and leads to a force support and thus an unloading of the weld seams 15.

The invention claimed is:

1. A motor vehicle, comprising:
   a carrier;
   an exhaust component comprising an exhaust component housing having a housing wall;
   a fixture fastening the exhaust component to the carrier, the fixture comprising at least one holder having an inner leg extending parallel to the housing wall and an outer leg standing away from the housing wall to the outside; and
   the housing wall comprising a passage opening, through which the outer leg protrudes, while the inner leg areally bears against the housing wall in an interior of the exhaust component housing; and
   wherein the exhaust component is an exhaust gas treatment device, comprising at least one element of the following group: catalytic converter, particle filter, SCR-system.

2. The motor vehicle according to claim 1, wherein the fixture comprises a covering which in the interior of the exhaust component housing bridges the passage opening and the respective inner leg and is fastened to the housing wall.

3. The motor vehicle according to claim 2, wherein the covering tightly closes off the passage opening from the inside.

4. The motor vehicle according to claim 2, wherein the fixture is fastened to the covering and is only indirectly fastened to the housing wall via the covering, or the respective inner leg and the covering are jointly fastened to the housing wall.

5. The motor vehicle according to claim 2, wherein the covering areally bears against the respective inner leg.

6. The motor vehicle according to claim 1, wherein the housing wall adjoining the passage opening comprises a protrusion protruding to the outside for the respective inner leg, in which the respective inner leg areally bears against the housing wall, wherein it can be more preferably provided that a depth of the protrusion substantially corresponds to a thickness of the respective inner leg.

7. The motor vehicle according to claim 1, wherein the fixture in addition to the respective holder comprises at least one reinforcing element, which comprises a support leg running parallel to the outer leg of the respective holder and areally bearing against said holder and a clamping leg running parallel to the inner leg of the respective holder and areally bearing against the housing wall on the outside, wherein the respective reinforcing element and the respective holder are position-fixed relative to each other.

8. The motor vehicle according to claim 1, wherein the at least one holder of the respective fixture comprises two holders, whose inner legs stand away in opposite direction from the outer legs areally bearing against each other, and wherein the outer legs of the two holders are fastened to each other.

9. The motor vehicle according to claim 7, wherein the fixture comprises two such reinforcing elements, whose clamping legs stand away from the support leg in opposite direction, wherein the two reinforcing elements form a reinforcing shoe, which can be fitted onto the outer leg of the one holder or onto the two outer legs of the two holders.

10. A component for a motor vehicle, comprising:
    a carrier;
    an exhaust component comprising an exhaust component housing having a housing wall;
    a fixture fastening the exhaust component to the carrier, the fixture comprising at least one holder having an inner leg extending parallel to the housing wall and an outer leg standing away from the housing wall to the outside; and
    the housing wall comprising a passage opening, through which the outer leg protrudes, while the inner leg areally bears against the housing wall in an interior of the exhaust component housing; and
    wherein the exhaust component is an exhaust gas treatment device, comprising at least one element of the following group: catalytic converter, particle filter, SCR-system.

* * * * *